Jan. 8, 1946.  R. N. SHONER  2,392,778
SEAL LEAKAGE INDICATOR FOR CANNED GOODS
Filed Feb. 6, 1943
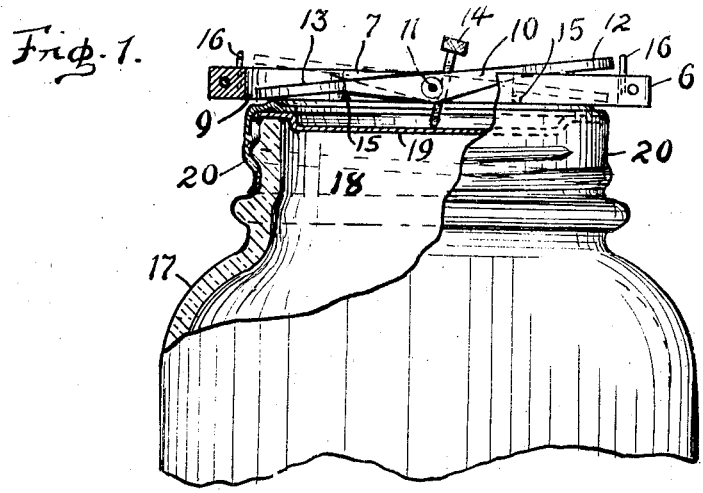
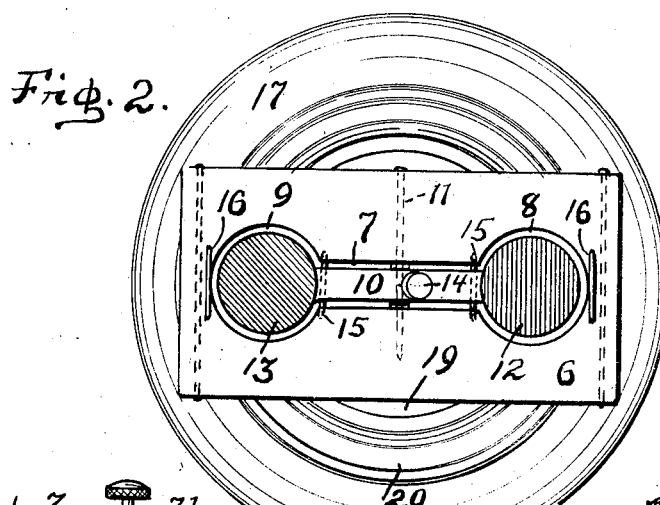
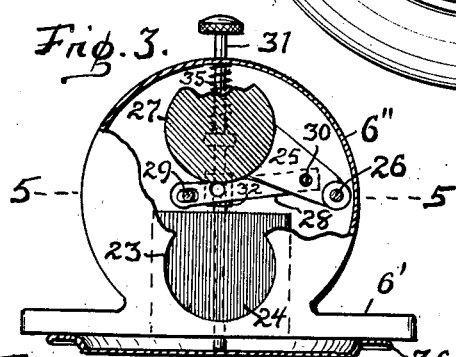
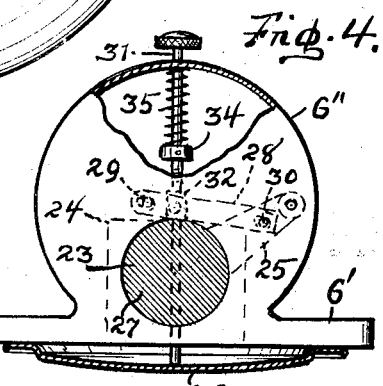
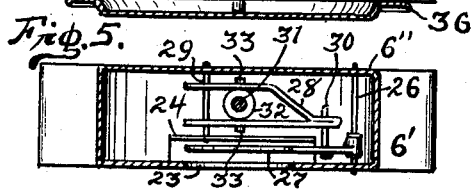
Robert N. Shoner INVENTOR.
BY H. G. Burns Patented Jan. 8, 1946

2,392,778

UNITED STATES PATENT OFFICE 2,392,778

SEAL LEAKAGE INDICATOR FOR CANNED GOODS

Robert N. Shoner, Fort Wayne, Ind.

Application February 6, 1943, Serial No. 474,947

7 Claims. (Cl. 33—169)

This invention relates to improvements in seal leakage indicators for canned goods and is applicable to that type of container that is closed and sealed by a thin metallic cap provided with a gutta-percha gasket lining that contacts with the neck of the container wherefore a hermetical seal is effected.

Ordinarily, when sealed containers of the type here referred to are filled with heated goods and the cap is applied, upon subsequent cooling of the contents of the container, decrease of pressure occurs therein due to contraction, whereupon the cap is drawn downwardly and firmly seated in place. Normally, the sealing caps are thin and flat in their midportions and subsequently become concave to more or less extent due to the decrease of pressure in the container.

An object of the instant invention is to provide an instrument that is applied to the sealing cap of a container after the container has been filled and closed by the cap, wherefore to indicate whether or not partial vacuum has occurred in the container after cooling and if sealing of the cap has thereby been rendered effective.

Another object of the invention is to provide an indicator by which to detect failure of the cap closing a container to become sealed thereon, thus to avert deterioration of the contents of the container.

And a further object of the invention is to afford an inexpensive simply operated detector for sealing caps and provide adjustable means by which the instrument is rendered adaptable to sealing caps that differ in shape from each other or have sealing rings by which the caps are sometimes temporarily held in place during the subsequent cooling operation of the contents of the containers.

Other objects and advantages of the invention appear in the following description.

An illustrative embodiment of the invention is shown in the accompanying drawing, in which:

Fig. 1 is a fragmentary side elevational view of a container provided with a cap and a sealing ring and showing one form of the indicator arranged in seal-testing position thereon, a portion being broken away;

Fig. 2 is a top plan view projected from Fig. 1;

Fig. 3 is a front elevational view of a seal tester of modified form applied to a seal cap in position as it appears before sealing of the cap occurs, portions being broken away;

Fig. 4 is a similar view of the modified seal indicator as it appears after sealing of the cap has occurred; and Fig. 5 is a view showing a horizontal section of Fig. 3 on the line 5—5 thereof.

The illustrative embodiment of the invention, as shown in Figs. 1 and 2, consists of a base 6 formed of a flat plate having an elongated aperture 7 therein, the ends of which are enlarged to form sight openings 8 and 9. In the aperture is disposed a teeter-bar 10 which is supported by a fulcrum pin 11 so as to have rocking movement thereon. One end of said bar is shaped to provide a disk 12 that is colored red as indicated, and the opposite end of the bar is similarly shaped to form another disk 13 that is colored green. These disks are made smaller than the sight openings so as to be free from contact with the surrounding walls of the base.

A contacting member 14, consisting of a screw, extends downwardly through the teeter-bar at a point closely adjacent to the fulcrum pin 10 and is threaded in the bar so as to afford axial adjustment of the screw. Preferably, the screw is located in the teeter-bar at the side of the fulcrum pin nearest the red disk 12 so that the corresponding end of the bar tends to swing downward because of the weight of the screw.

Secured to the lower face of the base 6, extending across the aperture 7 beneath the teeter-bar, at points adjacent said sight openings, are stops 15 by which tilting movement of the teeter-bar is limited in either direction, and projecting upwardly from the base at points adjacent the outer ends of the sight openings are provided sight members 16. These members preferably consist of light wire staples and are for the purpose of enabling the operator to make adjustments of the contact member 14 so the teeter bar will have the proper balance and range of movement when the instrument is applied.

In Figs. 1 and 2 is shown a container 17 having a threaded neck 18 that is closed by a sheet metal cap 19 secured temporarily in place by a sealing ring 20 as in the customary manner. When such sealing ring is used, after the container has been filled and closed by the cap, the indicating instrument is then superimposed with its base on the ring and with the lower end of the contact member 14 bearing on the cap 19 at the center thereof. The contact member is then adjusted by turning it until the red disk is raised to approximately the top of the adjacent gauge member 16. Upon cooling of the content of the container and consequent partial vacuum thereby occasioned therein, the cap is drawn downwardly allowing corresponding downward movement of the contact member and tilting of the teeter-bar, so the red disk is lowered into its sight opening in the base and the green disk is raised to its elevated position above its sight opening, and thus indicating that the partial vacuum in the container is maintained and the cap sealed.

The invention is applicable to the closed containers at any time after cooling of their contents even though the sealing rings are removed, in which event the base is first placed directly on the rim of an unsealed cap and the contact member 14 readjusted so the red disk is held in its elevated position approximately level with the top of the corresponding sight member. The instrument is then placed with its base on the cap of a closed container whereupon the teeter-bar will become tilted so the green disk is elevated, that is providing the central portion of the cap is held down by the partial vacuum in the container, thus indicating that the cap has been properly sealed.

The illustrative modified form of the invention shown in Figs. 3, 4 and 5, consists of a base 6' having thereon a case 6" provided in its front with a sight opening 23 back of which and suitably spaced therefrom is disposed a plate 24, colored red as indicated, so when viewed through said sight opening constitutes a signal.

Within the case is mounted an arm 25 on a supporting shaft 26 for swinging movement thereon and terminates at its free end with a signal member 27 colored green as indicated. The green disk is so arranged that when moved upon its pivotal support to its lowermost position it then is disposed between the sight opening 23 and the red colored plate concealing the latter from view, and when in its uppermost position the red plate is fully exposed and the green signal member is concealed within the case. The arm 25 is actuated by a lever 28 that is pivotally mounted loosely upon a supporting shaft 29 in the case and has engagement with a stud 30 on the arm 25 for the signal member.

A contacting shaft 31 vertically disposed extends through the case and the base thereof and has threaded thereon a cross-head 32 provided with trunnions 33 that extend into the branches of the lever 28 so that upon vertical movement of the contacting shaft the lever 28 and the arm 25 are moved accordingly. On the shaft 31 is secured a collar 34 and a compression spring 35 is disposed on said shaft between the collar and the wall of the case through which the shaft extends. The top surface of the collar preferably is made rough so that the contacting shaft is frictionally detained in adjusted positions when turned in the cross-head.

In using this modified form of the invention the base 6' is placed upon a sealing cap 36 that has not been sealed, with the lower end of the contacting member 31 resting on the cap at the center thereof. Then by manipulation of the contacting member 31 the signal member is raised to its uppermost position. After the cap has been positioned on the container and properly sealed, partial vacuum occurs in the container, the instrument is placed upon the top of the cap, whereupon, the contacting member 31 moves downwardly onto the concaved cap so the green signal member then is disposed between the sight opening and the red plate 24, thus indicating proper sealing of the cap with the container.

Variations from the particular construction above disclosed may be resorted to by the exercise of skill in the art, without departure from the scope of the invention.

What I claim is:

1. A seal leakage indicator for containers that are closed by sealing caps, said indicator consisting of a base having an aperture therein terminating at its ends in sight openings, a teeter-bar pivoted in said aperture provided at its ends with signal disks of different hue having movement respectively in said sight openings, means in the base to limit movement of said teeter-bar, a sight member on said base adjacent each of said disks to determine the relative positions thereof, and a sealing cap contacting member adjustably secured in said teeter-bar adjacent its fulcrum support, the arrangement being such that when said base is positioned on the sealing cap with said contactor resting on the center thereof, said teeter-bar is tilted in one direction or the other subject to flexure of said cap.

2. A seal leakage indicator for containers that are closed by sealing caps, said indicator consisting of a base having an aperture therein terminating at its ends in sight openings, a teeter-bar pivoted in said aperture provided at its ends with signal disks of different hue having movement respectively in said sight openings, means in the base to limit movement of said teeter-bar, and a sealing cap contacting member adjustably secured in said teeter-bar adjacent its fulcrum support, the arrangement being such that when said base is positioned on the sealing cap with said contactor resting on the center thereof, said teeter-bar is tilted in one direction or the other accordingly as said cap is flexed or not.

3. A seal leakage indicator for containers that are closed by sealing caps, said indicator consisting of a base having an aperture therein terminating at its ends in sight openings, a teeter-bar pivoted in said aperture provided at its ends with signal disks of different hue having movement respectively in said sight openings, a sight member on said base adjacent each of said disks, and a sealing cap contacting member adjustably secured in said teeter-bar adjacent its fulcrum support, the arrangement being such that when said base is positioned on the container cap with said contactor resting on the center thereof, said teeter-bar is tilted in one direction or the other accordingly as said cap is flexed or not.

4. A seal leakage indicator for containers that are closed by sealing caps, said indicator consisting of a base having an aperture therein terminating at its ends in sight openings, a teeter-bar pivoted in said aperture provided at its ends with signal disks of different hue having movement respectively in said sight openings as said teeter-bar is tilted, and a sealing cap contacting member adjustably secured in said teeter-bar adjacent its fulcrum support, the arrangement being such that when said base is positioned on the container cap with said contactor resting on the center thereof, said teeter-bar is tilted in one direction or the other accordingly as said cap is flexed or not.

5. A seal leakage indicator for containers that are closed by seal-caps having flexible central portions, said indicator consisting of a base adapted to rest upon the rim of such cap, a pivoted member in the base provided with signal means, and a sealing cap contactor adjustably secured in said member having engagement normally with the central portion of said cap when the base is positioned on the rim thereof and is without engagement with the cap upon flexure thereof.

6. A seal leakage indicator for a container having a flexible sealing cap, said indicator consisting of a base, a teeter-bar pivoted on the base so as to tilt normally in one direction, and a sealing cap contactor on said teeter-bar, adjustably movable relative thereto toward and from said cap when the indicator is in operative position thereon, the arrangement being such that the contactor engages the cap when said cap is not flexed, thus to tilt the teeter-bar in the opposite direction, and is out of contact with said cap upon flexure thereof, whereupon the teeter-bar then assumes its normal tilted position.

7. A seal leakage indicator for a container having a flexible sealing cap, said indicator consisting of a base, a teeter-bar pivoted on the base so as to tilt normally in one direction, and a sealing cap contactor on said teeter-bar provided with a contactor disposed to be held out of contact with or engage the sealing cap of a container while the indicator is positioned thereon, accordingly as said cap is flexed or not flexed, thus to cause said teeter-bar to assume a definite corresponding indicating position.

ROBERT N. SHONER.